Oct. 3, 1950 — T. K. BREDA — 2,524,304
TRASH RAKE
Filed July 20, 1946
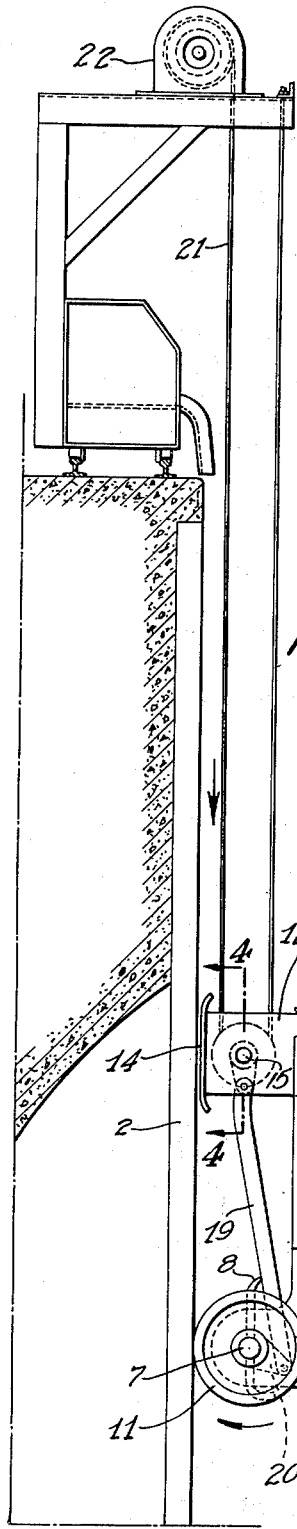
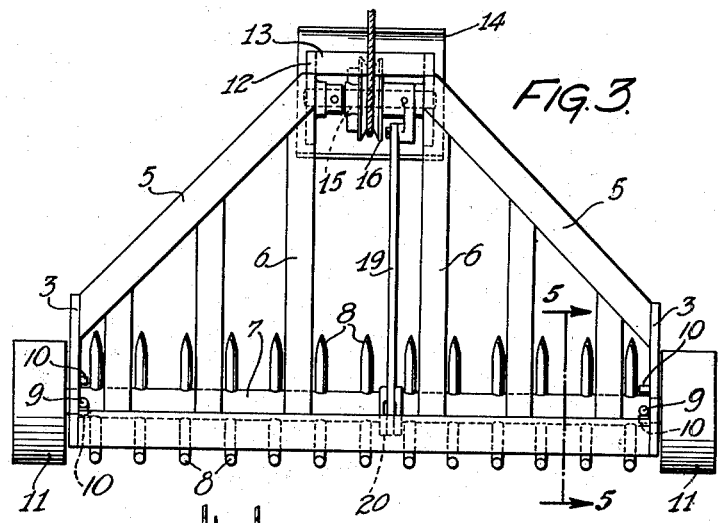
Inventor:
Thoralf K. Breda
by his Attorneys
Howson & Howson Patented Oct. 3, 1950

2,524,304

UNITED STATES PATENT OFFICE 2,524,304

TRASH RAKE

Thoralf K. Breda, York, Pa., assignor to S. Morgan Smith Company, York, Pa., a corporation of Pennsylvania Application July 20, 1946, Serial No. 685,086

6 Claims. (Cl. 210—176)

This invention relates to new and useful improvements in trash rakes, and more particularly to rakes for removing debris from trash racks or gratings across the intake end of a turbine, millrace, spillway, or the like.

One of the difficulties encountered in connection with trash rake installations prior to the present invention is that trash rakes usually cannot be used effectively upon vertical trash racks or upon steep racks having an angular slope of less than about 15 degrees from the vertical. This is so for the reason that the friction used to move the rake teeth which is generated by the wheels of the rake decreases as the rack angle becomes smaller (steeper), and at rack angles of less than about 15 degrees from the vertical the wheel friction produced is not sufficient to move the rake teeth to and from their operative and inoperative positions. Furthermore, in the case of vertical trash racks, while the flow of water through the rack will retain the rake firmly against the rack during operation, this is not true in cases of shut-down where no water is flowing, and it has been necessary heretofore to provide heavy and expensive guide structures for the rakes in order to insure retention thereof in position against the trash racks at all times.

With the foregoing in mind, the principal object of the present invention is to provide a novel and improved trash rake construction which may be used effectively upon very steep and even vertical trash racks with assured positive operation of the rake teeth and proper contact of the rake against the trash rack at all times.

Another object of the invention is to provide an improved trash rake of the character set forth having novel teeth operating means which is entirely independent of and not effected by the slope or angle of disposition of the trash rack.

Another object of the invention is to provide an improved trash rake of the type described wherein the teeth operating means is constructed and arranged to create a force movement tending to move the rake in the direction of the rack thereby insuring retention of the rake against the rack at all times.

A further object of the invention is to provide a novel and improved trash rake having the characteristics and advantages set forth which is of relatively simplified and inexpensive construction and which is entirely efficient and foolproof in operation and use.

These and other objects of the invention and various features and details of the construction and operation thereof are hereinafter fully set forth and described with reference to the accompanying drawing, in which:

Fig. 1 is an elevational view of a trash rake installation embodying a trash rake made according to the present invention.

Fig. 2 is a partial view similar to Fig. 1 illustrating certain operating characteristics of the present rake.

Fig. 3 is a front elevational view of a trash rake viewed from line 3—3, Fig. 1.

Fig. 4 is an enlarged fragmentary sectional view taken on line 4—4, Fig. 1; and

Fig. 5 is an enlarged sectional view taken on line 5—5, Fig. 3.

Referring now more particularly to the drawing, the trash rack, in conjunction with which the present invention is illustrated, comprises a series of vertically extending equally spaced parallel bars 2 arranged to provide a grill- or grating-like arrangement which acts as a barrier to arrest and collect trash and debris which otherwise would be carried by the water through the inlet, race, spillway, or the like.

The improved trash rake of the present invention, one embodiment of which is illustrated in the drawing, includes a frame comprising relatively spaced apart end or side plates 3 between which extends a horizontal member 4 and oppositely inclined upper frame members 5, the latter and the member 4 being additionally strenghtened and reinforced by means of a plurality of spaced parallel bars 6, for example, arranged as shown in Fig. 3 of the drawing.

Extending between the end or side plates 3 of the rake and parallel to and adjacent the horizontal frame member 4 is a shaft 7 having reduced end portions that extend through and are rotatably supported in the said side plates 3. Carried by the shaft 7 are a plurality of rake teeth 8 which may be fixedly secured to said shaft in any suitable manner. For example, the shaft 7 may be of tubular construction for the advantage of lightness and the rake teeth may be inserted through openings provided in said shaft and secured thereto by welding or the like.

Rotation of the shaft 7 is limited to approximately 90 degrees and the teeth 8 are secured in or to the shaft 7 so that in one limit position thereof the said teeth are disposed in the position shown in Fig. 2 of the drawing, and in the other limit position of the shaft are disposed in the position shown in Fig. 1 of the drawing. Limitation of the extent of rotation of the shaft 7 may be effected in the manner illustrated in the drawing by providing adjacent the ends of the shaft 7 and inwardly of the side frames 3 a fixed projection or pin 9 which moves with the shaft 7 between stops 10 in the form of projections on the side plates 3 which extend into the path of the pin 9. The stops 10 are spaced with respect to each other so that movement of the pin 9 therebetween serves positively to limit rotational movement of the shaft and its teeth 8 to about 90 degrees between the inoperative position shown in Fig. 1 wherein the said teeth 8 are disposed parallel to the rack bars 2 and the operative position shown in Fig. 2 wherein the teeth 8 are disposed perpendicular to said bars 2 and project a short distance inwardly therebetween. Rotationally mounted upon the extremities of the shaft 7 are wheels 11 whose peripheries are adapted to ride or run on certain of the rack bars 2 of the trash rack.

Secured to the upper end of the inclined frame members 5 are plates 12 which are disposed in relatively spaced planes parallel to the frame side members 3 and project laterally from the rake frame at the rack side thereof as shown. These plates 12 and the upper ends of the inclined frame members 5 are connected together by a cross member 13, and secured to the plate 12 at the free edges thereof is a skid or runner 14 which is adapted to ride upon the bars 2 of the trash rack.

Journalled in the plates 12 is a second shaft 15 which has secured thereon intermediate said plates 12 a pulley or sheave 16 comprising a hub portion 17. Also secured upon the shaft 15 is a crank member 18 which has pivotally connected thereto one end of a connecting rod 19, the other end of which is pivotally connected to crank member 20 which is fixedly secured upon the shaft 7 of the rake.

The rake is adapted to be raised and lowered upon the trash rack by means of a suitably flexible cable 21 operated by a suitably driven hoist 22. It is to be noted that the cable 21 extends downwardly from the hoist and passes about the pulley 16 from the rack side of the rake, then extends upwardly and has its free end anchored to a fixed part of the installation. Thus when the hoist 22 is operated to wind the cable 21 thereon the rake will move upwardly upon the rack bars 2 and when the hoist is reversed to unwind the cable therefrom the rake is caused to be lowered upon the rack bars 2.

The pulley or sheave 16 is utilized to effect rotation of the shaft 7 and its teeth 8 to and from the operative and inoperative positions previously described and this is accomplished by providing suitable friction means which may be associated with the pulley or sheave 16. Thus, for example, the hub 17 of the pulley may be provided with one or more radial bores or passages 23 therein which extend inwardly to the shaft 15 and receive therein elements 24 of suitable friction material such as, for example, lignum vitae, which engage against the surface of the shaft 15 under the pressure of springs 25. Suitable plugs 26 are threaded into the passages 23 to retain therein the friction elements 24 and springs 25, and these plugs 26 may be adjusted as required to vary the pressure exerted by springs 25 upon friction elements 24 to cause the latter to engage the shaft 15 with sufficient force or pressure to provide the necessary drive connection between the pulley 16 and the shaft 15 to rotate the latter and in turn the crank member 18 thereon which operates through the connecting rod 19 and the crank 20 upon the shaft 7 to rotate the latter and the teeth 8 as required.

Thus with the friction assembly in the hub 17 of the pulley 16 properly adjusted it will be apparent that as the hoist 22 is operated to unwind the cable 21 therefrom, thereby lowering the rake upon the rack, the pulley 16 will be moved in a counterclockwise direction with respect to Fig. 1 of the drawing with the result that the friction elements 24 cause the shaft 15 to rotate with the pulley 16 in that same direction so that the crank 18 is moved into the position shown in said Fig. 1 and operates through the connecting rod 19 and crank 20 to rotate the shaft 7 and teeth 8 into the inoperative position illustrated in which they are maintained against one of the stops 10 by the drag of the friction elements upon the shaft 15 which continues throughout the lowering movement of the rake and accompanying counterclockwise rotation of the cable pulley 16.

On the other hand, when the rake has been lowered the required distance and hoist 22 is operated to raise or move the rake upwardly over the rack bars 2 thereby rotating the pulley 16 in the clockwise direction with respect to Figs. 1 and 2, the friction elements 24 will operate immediately through the shaft 15, crank 18 and connecting rod 19 and crank 20 to cause the shaft 7 and its teeth 8 to be rotated into the operative position shown in Fig. 2 of the drawing so that the teeth are positioned to dig into and engage debris on the rack upon initial upward movement of the rake.

It is to be noted that in a trash rake made in accordance with the present invention rotation of the shaft 7 to move the rake teeth 8 to and from their operative and inoperative positions as described is effected by a friction force which is entirely independent of the rake wheels 11 and hence this force does not vary with changes in the angle of slope of the trash racks and will be constant even in the case of vertical racks. Furthermore, by arranging the lift portion of the hoist cable 21 at the rack side of the pulley 16, a friction moment is created in the direction of the rack which tends to move the rake toward the rack thereby maintaining the rake in proper position against the rack bars 2 at all times.

From the foregoing it will be apparent that a trash rake made in accordance with the present invention provides a novel and improved trash rake construction which may be used effectively upon very steep and even vertical trash racks with assured positive operation of the rake teeth and proper contact of the rake against the trash rack at all times. The invention further provides an improved trash rake of the character set forth having novel teeth operating means which is entirely independent of and not effected by the slope or angle of disposition of the trash rack. The invention also provides an improved trash rake of the type described wherein the teeth operating means is constructed and arranged to create a force moment tending to move the rake in the direction of the rack thereby insuring retention of the rake against the rack at all times. Furthermore, the invention provides a novel and improved trash rake having the characteristics and advantages set forth which is of relatively simplified and inexpensive construction and which is entirely efficient and foolproof in operation and use.

While a particular embodiment of the present invention has been illustrated and described

I claim:

1. In a trash rake, a frame, wheels supporting said frame for travel up and down a trash rack, a member rotatably mounted in said frame with its rotational axis parallel to the trash rack, a set of teeth mounted in said member and arranged circumferentially thereof so that in one limit position of the member the teeth are operatively disposed substantially perpendicular to the rack and in the other limit position are inoperatively disposed substantially parallel to the rack, a shaft rotatably supported in said frame, a sheave rotatable on said shaft, drive means interconnecting said sheave and shaft operable to cause said shaft to rotate with the sheave, a hoist cable about the sheave operable when pulled to raise the rake and rotate the sheave and shaft in one direction and operable when played-out to lower the rake and rotate the sheave and shaft in the other direction, and connections between said shaft and the member operable upon rotation of the shaft in said one direction to actuate the member into said one limit position with the teeth perpendicular to the rack and upon rotation of the shaft in said other direction to actuate the member in said other limit position with the teeth parallel to the rack.

2. In a trash rake, a frame, wheels supporting said frame for travel up and down a trash rack, a member rotatably mounted in said frame with its rotational axis parallel to the trash rack, a set of teeth mounted in said member and arranged circumferentially thereof so that in one limit position of the member the teeth are operatively disposed substantially perpendicular to the rack and in the other limit position are inoperatively disposed substantially parallel to the rack, a shaft rotatably supported in said frame, a sheave rotatable on said shaft, drive means interconnecting said sheave and shaft operable to cause said shaft to rotate with the sheave, a hoist cable about the sheave operable when pulled to raise the rake and rotate the sheave and shaft in one direction and operable when played-out to lower the rake and rotate the sheave and shaft in the other direction, and connections between said shaft and the member operable upon rotation of the shaft in said one direction to actuate the member into said one limit position with the teeth perpendicular to the rack and upon rotation of the shaft in said other direction to actuate the member in said other limit position with the teeth parallel to the rack, said cable having the lift portion thereof at the rack side of said frame and creating a force moment in the direction of the rack operable to maintain the rake against said rack.

3. In a trash rake, a frame, wheels supporting said frame for travel up and down a trash rack, a member rotatably mounted in said frame with its rotational axis parallel to the trash rack, a set of teeth mounted in said member and arranged in a line substantially normal to the rotational axis of the member, stops limiting rotation of the member between one limit position wherein the teeth are operatively disposed substantially perpendicular to the rack and another limit position wherein said teeth are inoperatively disposed substantially parallel to the rack, a shaft rotatably supported in said frame, a sheave rotatable on said shaft, drive means interconnecting said sheave and shaft operable to cause said shaft to rotate with the sheave, a hoist cable about the sheave operable when pulled to raise the rake and rotate the sheave and shaft in one direction and operable when played-out to lower the rake and rotate the sheave and shaft in the other direction, and connections between said shaft and the member operable upon rotation of the shaft in said one direction to actuate the member into said one limit position with the teeth perpendicular to the rack and upon rotation of the shaft in said other direction to actuate the member in said other limit position with the teeth parallel to the rack.

4. In a trash rake, a frame, wheels supporting said frame for travel up and down a trash rack, a member rotatably mounted in said frame with its rotational axis parallel to the trash rack, a set of teeth mounted in said member and arranged in a line substantially normal to the rotational axis of the member, stops limiting rotation of the member between one limit position wherein the teeth are operatively disposed substantially perpendicular to the rack and another limit position wherein the teeth are inoperatively disposed substantially parallel to the rack, a shaft rotatably supported in said frame, a sheave rotatable on said shaft, a friction drive interconnecting said sheave and shaft operable to cause said shaft to rotate with the sheave a hoist cable about the sheave operable when pulled to raise the rake and rotate the sheave and shaft in one direction and operable when played-out to lower the rake and rotate the sheave and shaft in the other direction, and connections between said shaft and the member operable upon rotation of the shaft in said one direction to actuate the member into said one limit position with the teeth perpendicular to the rack and upon rotation of the shaft in said other direction to actuate the member in said other limit position with the teeth parallel to the rack, said cable having the lift portion thereof at the rack side of said frame and creating a force moment in the direction of the rack operable to maintain the rake against said rack.

5. Apparatus as claimed in claim 1 wherein the drive means interconnecting the sleeve and shaft members comprises a friction element carried by one of said members and urged into engagement with the other member.

6. Apparatus as claimed in claim 4 wherein the drive means interconnecting the sleeve and shaft members comprises a friction element carried by one of said members and urged into engagement with the other member.

THORALF K. BREDA.

REFERENCES CITED

The following references are of record in the file of this patent:

UNITED STATES PATENTS

| Number | Name | Date |
|---|---|---|
| 1,240,560 | Gilmore | Sept. 18, 1917 |
| 2,186,790 | Smyser | Jan. 9, 1940 |
| 2,335,573 | Scott | Nov. 30, 1943 |

FOREIGN PATENTS

| Number | Country | Date |
|---|---|---|
| 131,534 | Switzerland | May 1, 1929 |
| 595,526 | France | July 18, 1925 |